United States Patent
Allen et al.

[19]

[11] Patent Number: 6,115,200
[45] Date of Patent: Sep. 5, 2000

[54] METHOD AND APPARATUS FOR PREVENTING WRITE OPERATIONS IN THE PRESENCE OF POST-SHOCK MOTION

[75] Inventors: Donald G. Allen, Morgan Hill; Louis Joseph Serrano, San Jose, both of Calif.

[73] Assignee: International Business Machines Corporation, Armonk, N.Y.

[21] Appl. No.: 08/794,614

[22] Filed: Feb. 3, 1997

[51] Int. Cl.[7] ................................................. G11B 19/04
[52] U.S. Cl. ............................................... 360/60; 360/75
[58] Field of Search .................................. 360/69, 77.01, 360/60, 77.02, 75; 318/560

[56] References Cited

U.S. PATENT DOCUMENTS

| | | |
|---|---|---|
| 4,862,298 | 8/1989 | Genheimer et al. . |
| 4,947,093 | 8/1990 | Dunstan et al. . |
| 5,333,138 | 7/1994 | Richards et al. . |
| 5,491,394 | 2/1996 | Harwood et al. . |
| 5,654,840 | 8/1997 | Patton et al. . |
| 5,663,847 | 9/1997 | Abramovitch . |
| 5,696,645 | 12/1997 | Laughlin ................................ 360/75 |
| 5,721,457 | 2/1998 | Sri-Jayantha et al. . |

FOREIGN PATENT DOCUMENTS

| | | |
|---|---|---|
| 62-089269 | 4/1987 | Japan . |
| 63-149887 | 6/1988 | Japan . |
| 1-208776 | 8/1989 | Japan . |
| 1-229454 | 9/1989 | Japan . |
| 1-277361 | 11/1989 | Japan . |
| 3-207063 | 9/1991 | Japan . |
| 4-176063 | 6/1992 | Japan . |
| 4-222970 | 8/1992 | Japan . |
| 4-330679 | 11/1992 | Japan . |
| 8-124271 | 5/1996 | Japan . |
| 8-279238 | 10/1996 | Japan . |

OTHER PUBLICATIONS

IBM Technical Disclosure Bulletin, "Optimal Means for Generating a Write Inhibit in Hard Disk Drives in Response to External Shock Using Accelerometers", vol. 39, No. 10, p. 131 (Oct. 1996).

*Primary Examiner*—Andrew L. Sniezek
*Attorney, Agent, or Firm*—Altera Law Group, LLC

[57] ABSTRACT

The present invention is a method and apparatus for preventing a write operation to a storage medium of a data storage system in response to a shock event which excites the component modes of the data storage system. In accordance with the invention, an apparatus is provided which determines the occurrence of a shock event which causes post-shock movement of the transducer resulting from excitation of one or more of the component modes of the data storage system, measures the movement of the transducer for at least a predetermined period of time after the shock event, and prevents the write operation until the movement of the transducer is less than a predetermined threshold throughout this predetermined period of time.

27 Claims, 4 Drawing Sheets

METHOD AND APPARATUS FOR PREVENTING WRITE OPERATIONS IN THE PRESENCE OF POST-SHOCK MOTION

BACKGROUND OF THE INVENTION

1. Field of the Invention

This invention relates in general to data storage systems, and more particularly, to a method and apparatus for preventing write operations to a data storage medium in response to the data storage system being subjected to a shock event.

2. Description of Related Art

A typical data storage system includes a magnetic medium for storing data in magnetic form and a transducer used to read and/or write magnetic data from/to the storage medium. A disk storage device, for example, includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks.

In a typical digital data storage system, digital data is stored in the form of magnetic transitions on a series of concentric, spaced tracks comprising the surface of the magnetizable rigid data storage disks. The tracks are generally divided into a plurality of sectors, with each sector comprising a number of information fields. One type of information field is typically designated for storing data, while other fields contain track and sector position identifications and synchronization information, for example. Data is transferred to, and retrieved from, specified track and sector locations by the transducers which follow a given track and move from track to track, typically under the servo control of a controller.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

To reduce system errors, it is desirable to locate the read/write elements within the boundaries of each track during the read and write operations of the disk drive. If the read/write elements are moved toward an adjacent track by an external disturbance, the data in the adjacent track can be corrupted if a write operation is in progress. For example, if the read/write transducers move while the system is writing, the new data may write over the old data on the adjacent track, resulting in an unrecoverable loss of the old data.

Present data storage systems typically prevent head movement by employing a closed-loop servo control system. During normal data storage system operation, a servo transducer, generally mounted proximate the read/write transducers, or, alternatively, incorporated as the read element of the transducer, is typically employed to read information for the purpose of following a specified track (track following) and seeking specified track and data sector locations on the disk (track seeking).

Despite the servo system, data storage systems are susceptible to problems arising from external shock and vibrational loads. An excessive shock or vibrational load (shock event) may cause the read/write elements to move off track, for example, to an adjacent track. If this head movement occurs while the drive is writing data, the old data on the adjacent track may be lost. It is therefore desirable to have a data storage system which prevents data from being lost when the system is subjected to a shock event. Typically servo systems are too slow to prevent at least some data from being lost, particularly if a high frequency shock event were to occur.

Typically systems for preventing write operations when the data storage system is subject to a shock event only inhibit write operations in the presence of the shock event. Oscillations in data storage systems caused by transient shock motion resulting from the excitation of the component modes of the data storage system are not accounted for. That is, when the shock event stops, these systems allow write operations to be performed while post-shock motion or oscillations occur. For example, if the initial offtrack magnitude of the read/write elements caused by a shock event is sufficiently large to be of concern, the data storage system will cause write operations to stop by setting a write inhibit flag. The write inhibit flag is then dropped when the read/write elements are positioned ontrack by the servo system. The read/write elements however are typically positioned ontrack prior to the dissipation of the energy of the shock event. In other words, the read/write elements often oscillate about the track several times before the energy of the shock dissipates. The offtrack that occurs during these oscillations is typically much larger than the initial offtrack because of the gains of the modes that are excited. If the read/write elements then move offtrack again because one or more component modes were excited by the shock, the written data may be unreadable. It is also possible that data on an adjacent track can be overwritten and made unreadable.

It can be seen then that there is a need for a method and apparatus for preventing write operations until the energy of a shock event has dissipated.

SUMMARY OF THE INVENTION

To overcome the limitations in the prior art described above, and to overcome other limitations that will become apparent upon reading and understanding the present specification, the present invention discloses a method and apparatus for preventing a write operation to a storage medium of a data storage system in response to a shock event which excites the component modes of the system.

The present invention solves the above-described problems by determining the occurrence of the shock event which causes post-shock movement of the transducer resulting from excitation of one or more of the component modes of the data storage system, measuring the movement of the transducer for at least a predetermined period of time after the shock event, and preventing the write operation until the movement of the transducer is less than a predetermined threshold.

One exemplary system in accordance with the principles of the present invention includes a shock sensing circuit and post-shock movement sensing circuit, both operatively coupled to a latch controlling the write gate of the write head. During a shock event, the shock sensing circuit senses the shock event and disables the write gate. Then after the shock event, the post-shock movement sensing circuit measures post-shock movement of the transducer to determine whether such movement is within a predetermined safe region. When the oscillations are within the safe region the write gate is enabled so that write operations may be performed.

An aspect of the present invention is that write operations are prevented in the presence of oscillations of the transducer caused by excitation of one or more of the component modes of the data storage system by the shock event.

These and various other features of novelty as well as advantages which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

According to the present invention, post-shock movement of the transducer resulting from excitation of one or more of the component modes of the data storage system by the shock event is measured, and write operations are prevented until the post-shock transducer movement falls beneath a predetermined threshold.

Figure 1:
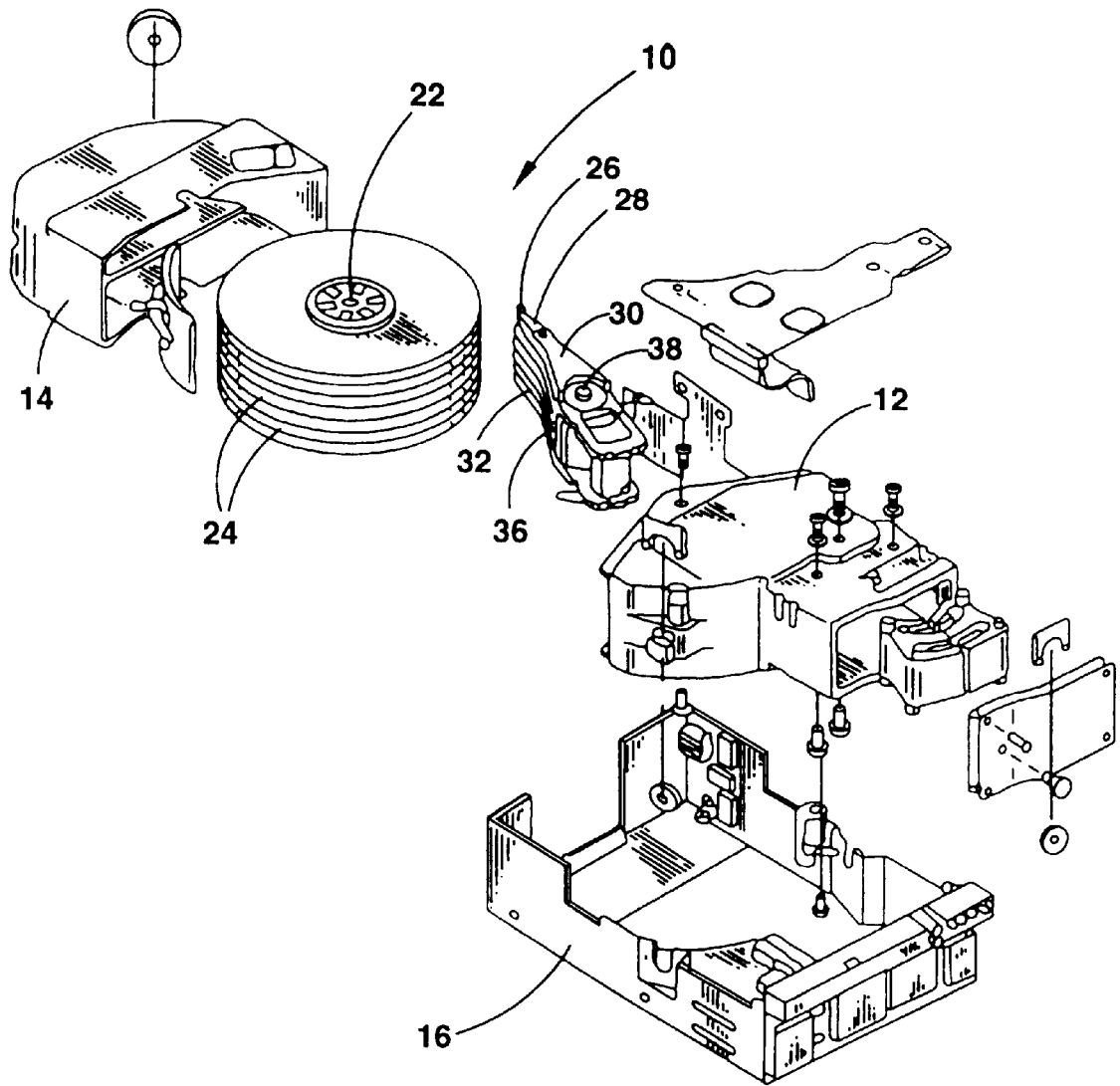
FIG. 1 is an exploded view of a data storage system according to the present invention.

FIG. 1 illustrates an exploded view of a disk drive system 10. The disk drive 10 includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 1, eight disks 24 are attached to the spindle shaft 22 in spaced apart relation. The disks 24 rotate on spindle shaft 22 which is powered by a motor (not shown). Information is written on or read from the disks 24 by magnetoresistive (MR) heads or transducers (not shown) which are supported by sliders 26 and coupled to a channel for processing read and write information (not shown). Preferably, sliders are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly in accordance with the present invention in an arcuate path across the surface of the storage disk 24. It should be noted that the disk drive described above is provided by way of example and not of limitation. Those skilled in the art will recognize that any data storage system, including optical, magneto-optical, and tape drives, for example, having at least one data storage medium and transducer may be subject to data corruption resulting from post-shock motion of the transducer and may benefit from the present invention.

Figure 2:
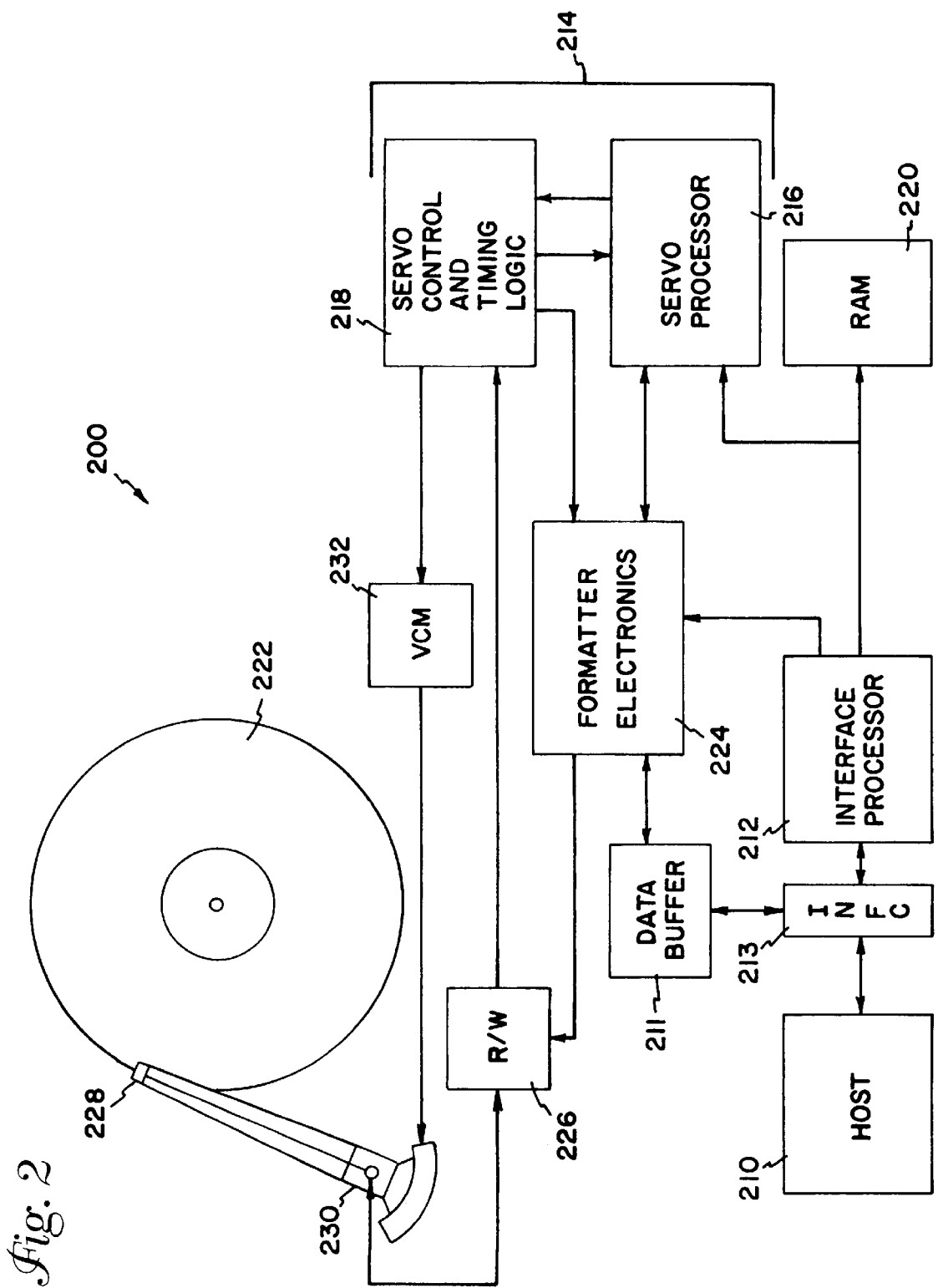
FIG. 2 illustrates a block diagram of a data storage system in accordance with the invention.

FIG. 2 illustrates a block diagram of an exemplary computer disk drive system 200 suitable for practicing the invention. It shall be understood that the general read/write and servo functions of a disk drive are well-known in the art, and their particular implementation is not an aspect of the present invention unless expressly noted. A host computer system 210 may be coupled to a disk drive system 200 via a buffer controller in interface block 213 and an interface processor 212. The interface processor 212 processes commands from the host system 210 and in turn communicates with a servo controller 214 and formatter electronics 224. The servo controller 214 includes a servo processor 216 and servo control and timing logic 218. Data parameters may be stored in memory such as random access memory (RAM) 220 or data buffer 211, or alternatively the data may be stored on the disk 222 itself. The servo processor 216 receives commands from the interface processor 212.

Command and sequences and data to be written to the disk 222 are routed to the formatter electronics 224. The read/write circuit 226 conditions the data and routes the data to the head 228 at the end of the actuator arm 230 for writing to the disk 222. Data read from the disk 222 by the transducer or sensor 228 is received by the read/write circuit 226 and conditioned to provide a read pulse output. The read pulse output is then routed to the formatter electronics 224 for processing before being provided to the host 210 via the data buffer 211 and interface electronics (INFC) 213. The interface electronics 213 is coupled to the bus from the host 210 and communicates with the interface processor 212 and data buffer 211.

The servo processor 216 provides control signals to the servo control and timing logic 218. The servo control and timing logic 218 interprets the control signals from the servo processor 216 and sends voice coil control signals to the voice coil motor 232. The voice coil motor 232 drives the actuator arm 230 in accordance with the control signals. The actuator arm 230 supporting the head 228 is driven by the voice coil motor 232 to move the transducer 228 to a target track position on the disk 222. The servo control and timing logic 218 outputs to the servo processor 216 position data indicative of the track position corresponding to the current position of the transducer 228 from servo data read out from the disk 222. The position data may be used to generate servo control information, such as a position error signal (PES signal), values of which indicate the offtrack magnitude of the transducer.

Figure 3:
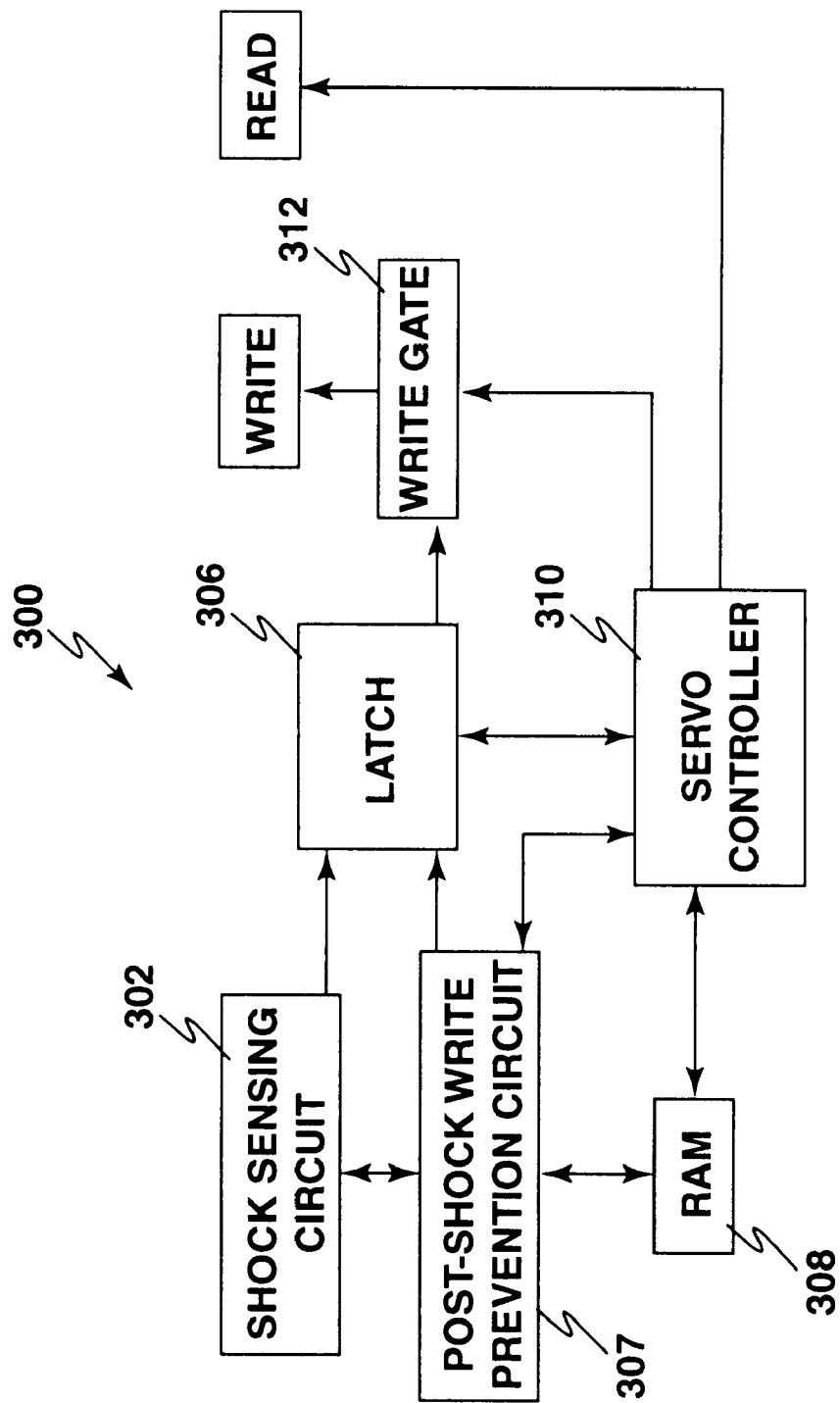
FIG. 3 illustrates a block diagram of an exemplary write prevention system in accordance with the invention.

FIG. 3 is a block diagram illustrating an exemplary write prevention system 300 for preventing a write operation to data storage medium in response to a shock event. The write prevention circuit includes a shock sensing circuit 302 for sensing shock events and a post-shock movement sensing circuit 304 for sensing the movement of the transducer resulting from excitation of one or more of the component modes of the data storage system by the shock event. Both the shock sensing circuit 302 and the post-shock movement sensing circuit 304 are operatively coupled to a latch 306 which provides a signal to the write gate 312 to enable and disable the write gate 312.

Though the shock sensing circuit 302 and the post-shock movement sensing circuit 304 are illustrated as being separate from the servo controller 310, it is noted that the functionality of both sensing circuits 302 and 304 may be embedded and/or programmed within the servo controller 310. Moreover, although the various components of the servo control system and write prevention system 300 are illustrated through the use of circuits, it should be appreciated that these components may be implemented through the use of software (in addition to or in place of circuitry) without loss of functionality.

Generally, when a disk drive is subject to a shock event, the shock sensing circuit 302 detects the shock event and sets the latch 306, which in turn disables the write gate, thereby preventing write operations. After the shock sensing circuit detects a shock event, the post-shock movement sensing circuit 304 measures transducer post-shock movement and determines whether the movement exceeds a predetermined threshold. If so, the write gate remains disabled, otherwise the write gate is enabled so that write operations may be performed.

Generally, any number of well known circuits may be used to sense the occurrence of a shock event. Exemplary shock sensing circuits will be briefly discussed with more detailed implementation being left to those of skill in the art. For example, the shock sensing circuit 302 may receive PES values and compare these values to a given threshold, and if the PES values exceed the predetermined threshold, the shock sensing circuit 302 may indicate that a shock event has occurred. In an alternate embodiment, the shock sensing circuit 302 may include a low pass filter through which a power waveform of the PES signal is passed. The filtered power signal may then be compared to a predetermined threshold value to determine whether a shock event has occurred. In yet a different embodiment, the shock sensing circuit 302 may include an external shock sensor, such as an accelerometer, which in response to a shock event generates a signal which is compared against a threshold value to determine the presence of a shock event.

After a shock event is detected, the post-shock movement sensing circuit 304 is activated. The post-shock movement sensing circuit 304 may be activated in a variety of manners. For example, the circuit 304 may receive a signal from the shock sensing circuit 302, the latch circuit 306, or the servo controller 310. Generally, the post-shock movement sensing circuit 304 measures the magnitude of oscillations of the transducer for a period of time after the shock event and continues to prevent the write operation until the oscillations fall below a predetermined threshold.

In the exemplary embodiment, when a write operation is halted by the shock sensing circuit 302 in response to a shock, the post-shock movement sensing circuit 304 receives a set of consecutive servo samples, such as PES values. This may be accomplished by sampling a PES signal shortly after sensing the shock event, for example. Each of the servo samples is then compared to a predetermined threshold value indicative of a transducer offtrack limit established for safe writing. This limit is typically set by transducer design specifications. A typical transducer offtrack limit is 17%. Those skilled in the art however will recognize that other values may be used as dictated by the transducer design specifications.

To assure post-shock movement resulting from excitation of each frequency component mode has subsided, the set of servo samples preferably spans an amount of time at least equal to the time required for one complete cycle of the component mode in the data storage system which has the lowest frequency. The lowest frequency component mode may, for example, be determined by rigidly mounting the drive to a vibration table in each of its major axes, applying a random or swept sine vibration to the disk drive, and measuring the transfer function of the transducer offtrack magnitude.

Figure 4:
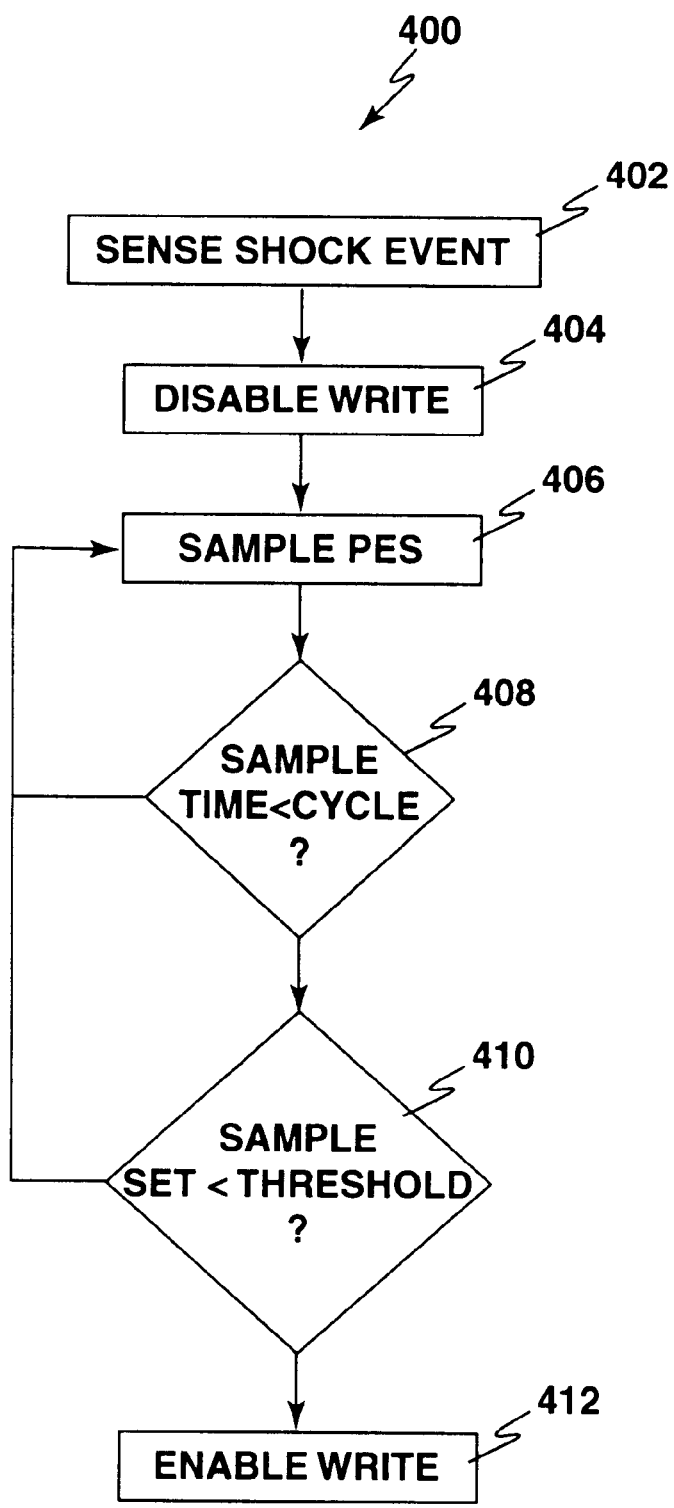
FIG. 4 is a flow chart illustrating an exemplary process for preventing write operations according to the invention.

Turning now to FIG. 4, there is shown a flow chart 400 illustrating an exemplary process for preventing write operations in the presence of a shock event and the post-shock motion resulting therefrom. Generally, the process involves sensing the shock event and inhibiting write operations until the energy of the shock event has dissipated a sufficient amount.

More specifically, step 402 represents the write prevention circuit 300 sensing a shock event. This step may, for example, include a shock sensing circuit 302 measuring shock events and determining whether a measured shock event exceeds a predetermined safe writing threshold. If a shock event of sufficient magnitude is sensed, the write prevention circuit disables the write gate as indicated at step 404. This step may include the shock sensing circuit 302 setting a write inhibit flag.

The sensing of a shock event exceeding the safe writing threshold activates the post-shock movement sensing circuit 304 which receives servo samples, such as PES values, as indicated at step 406. The servo samples may be taken under the control of and received from the servo controller 310, for example. After a PES value is received, the write prevention circuit 300 determines whether the sample time of the PES values has exceeded the lowest frequency mode cycle, as indicated at step 408. If not, another PES value is sampled and received, otherwise control moves to decision step 410. At step 410, the write prevention circuit determines whether each PES value in the sampled set falls below a predetermined threshold indicative of excessive post-shock motion, i.e., motion exceeding a safe writing threshold. If not, control moves to step 406 where another servo sample is received. Otherwise, if each of the servo samples in the sampled set falls below the predetermined threshold (indicating that the energy of the shock has dissipated), the write gate is enabled so that write operations may be performed 412.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of preventing a write operation to a storage medium of a data storage system in response to a shock event, the data storage system having a transducer and one or more frequency component modes, comprising:

detecting a shock event causing a read/write element to move offtrack of a target position;

determining whether the shock event causes an offtrack displacement of the read/write element from the target track greater than a first predetermined level;

inhibiting write operations during the shock event when it is determined that the shock event causes an offtrack displacement of the read/write element from the target track greater than a first predetermined level;

positioning the read/write element back ontrack to the target position;

after the shock event, measuring the post-shock offtrack oscillations of the read/write element; and continuing to inhibit write operations until the post-shock offtrack oscillations of the read/write element are less than a second predetermined level.

2. The method of claim 1, wherein the determining step includes the steps of:

measuring a number of PES values; and determining whether a certain consecutive number of the PES values exceed the first predetermined level.

3. The method of claim 1, wherein the determining step includes the steps of:

measuring a PES signal and generating a power waveform of the PES signal;

filtering the PES power waveform to pass high frequency components of the PES power waveform; and determining whether the filtered PES power waveform exceeds the first predetermined level.

4. The method of claim 1, wherein the determining step includes the steps of:

measuring the acceleration of the data storage system caused by the shock event using an accelerometer; and determining whether the acceleration exceeds the first predetermined level.

5. The method of claim 1, wherein the inhibiting step includes the step of disabling a write gate of the data storage system.

6. The method of claim 1, wherein the inhibiting step prevents the write operation while the read/write element is measured to be offtrack.

7. The method of claim 1, wherein the continuing to inhibit step prevents the write operation after the shock event has ended.

8. The method of claim 1, wherein the continuing to inhibit step inhibits write operations for one complete cycle of a lowest frequency component mode.

9. The method of claim 1, wherein:

the measuring step includes the step of receiving a consecutive set of servo samples for one complete cycle of a lowest frequency component mode; and the continuing to inhibit step inhibits write operations until each of the servo samples falls below the second predetermined level.

10. The method of claim 9, wherein the servo samples comprise PES values.

11. The method of claim 1 wherein the post-shock offtrack oscillations of the transducer results from excitation of one or more of the component modes and wherein the step of the continuing to inhibit inhibits write operations for one complete cycle of a lowest frequency component mode.

12. A data storage system having component modes, comprising:

a housing;

a data storage medium having a track;

a spindle motor mounted to the housing and adapted for rotating the data storage disk;

an actuator assembly movably mounted to the housing;

a transducer mounted to the actuator assembly; and a write prevention apparatus comprising:

a shock sensor for detecting a shock event causing the transducer to move offtrack from a target position and determining whether the shock event causes an offtrack displacement of the transducer from the target track greater than a first predetermined level;

a post-shock sensor for measuring the post-shock offtrack oscillations of the transducer after the shock event and determining whether the post-shock offtrack oscillations of the transducer are less than a second predetermined level; and a latch responsive to the shock sensor for preventing write operations when the shock event causes an offtrack displacement of the transducer from the target track greater than a first predetermined level and responsive to the post-shock sensor to continue inhibiting write operations until the post-shock offtrack oscillations of the transducer are less than a second predetermined level.

13. The system of claim 12, wherein the shock sensor measures a number of PES values and determines whether a certain consecutive number of the PES values exceed the first predetermined level.

14. The system of claim 12, wherein the shock sensor measures a PES signal and generates a power waveform of the PES signal, filters the PES power waveform to pass high frequency components of the PES power waveform and determines whether the filtered PES power waveform exceeds the first predetermined level.

15. The system of claim 12, wherein the shock sensor measures the acceleration of the data storage system caused by the shock event using an accelerometer and determines whether the acceleration exceeds the first predetermined level.

16. The system of claim 12, wherein the latch disables a write gate of the data storage system.

17. The system of claim 12, wherein the latch prevents the write operation when the shock event causes an offtrack displacement of the transducer from the target track greater than a first predetermined level and until the post-shock offtrack oscillations of the transducer are less than a second predetermined level.

18. The system of claim 12, wherein the latch prevents the write operation until transducer motion caused by excitation of one or more component modes of the data storage system have fallen below the second predetermined level.

19. The system of claim 12, wherein the post-shock sensor continues to inhibit write operations for one complete cycle of a lowest frequency component mode.

20. The system of claim 12, wherein:

the post-shock sensor includes means for receiving a consecutive set of servo samples over a period of time at least equal to the time required for one complete cycle of a lowest frequency component mode; and the latch includes means for preventing the write operation of the data storage system until each of the servo samples falls below the second predetermined level.

21. The system of claim 20, wherein the servo samples comprise PES values.

22. The system of claim 12 wherein the post-shock movement is caused by excitation of one or more of the component modes of the data storage system, and the latch prevents write operations during transducer motion caused by the excitation of one or more of the component modes.

23. A system adaptable for use in preventing a write operation to a storage medium of a data storage system in response to a shock event, the data storage system having a transducer and component modes, comprising:

a shock sensor configured to detect a shock event causing the transducer to move offtrack from a target position and to determine whether the shock event causes an offtrack displacement of the transducer from the target track greater than a first predetermined level; and a post-shock movement sensor configured to measure post-shock offtrack oscillations of the transducer after the shock event and to determine whether the post-shock offtrack oscillations of the transducer are less than a second predetermined level.

24. The system of claim 23, wherein the post-shock movement sensor prevents the write operation until the magnitude of the transducer oscillations are less than a second predetermined level.

25. The system of claim 23, wherein the post-shock movement sensor prevents write operation until transducer motion caused by excitation of one or more component modes of the data storage system have fallen below the second predetermined level.

26. The system of claim 25, wherein the post-shock movement sensor continues to inhibit write operations for one complete cycle of a lowest frequency component mode.

27. The system of claim 23, wherein the post-shock movement sensor is configured to receive a consecutive set of servo samples over a period of time at least equal to the time required for one complete cycle of a lowest frequency component mode, and to prevent the write operation of the data storage system until each of the servo samples falls below the second predetermined level.

* * * * *